US005477214A

United States Patent [19]

Bartel

[11] Patent Number: 5,477,214

[45] Date of Patent: Dec. 19, 1995

[54] CENTRAL LOCK SYSTEM FOR AUTOMOTIVE VEHICLE

[75] Inventor: Peter Bartel, Hattingen, Germany

[73] Assignee: Kiekert GmbH & Co. KG, Heiligenhaus, Germany

[21] Appl. No.: 393,258

[22] Filed: Feb. 23, 1995

Related U.S. Application Data

[63] Continuation of Ser. No. 71,647, Jun. 3, 1993, abandoned.

[30] Foreign Application Priority Data

Jun. 27, 1992 [DE] Germany .......................... 42 21 142.5

[51] Int. Cl.$^{6}$ .............................. G06F 7/04; G08C 19/00

[52] U.S. Cl. ................................ 340/825.31; 340/825.69

[58] Field of Search ......................... 340/825.31, 825.34, 340/825.69, 825.72

[56] References Cited

U.S. PATENT DOCUMENTS

| | | | |
|---|---|---|---|
| 4,596,985 | 6/1986 | Bongard et al. | 340/825.34 |
| 4,686,529 | 8/1987 | Kleefeldt | 340/825.72 |
| 4,904,993 | 2/1990 | Sato | 340/825.72 |
| 5,034,997 | 7/1991 | Iwasaki | 340/825.72 |

FOREIGN PATENT DOCUMENTS

| | | |
|---|---|---|
| 2911828 | 10/1980 | Germany . |
| 3320721A1 | 12/1984 | Germany . |
| 3244049C2 | 6/1986 | Germany . |
| 3300732C2 | 9/1987 | Germany . |
| 3636822C1 | 10/1987 | Germany . |
| 3740770A1 | 6/1989 | Germany . |
| 3840857A1 | 6/1990 | Germany . |
| 3905651A1 | 8/1990 | Germany . |

OTHER PUBLICATIONS

Wade, Signal Coding and Processing, 1987, Ellis Horwood Ltd., pp. 120–123.

*Primary Examiner*—Alyssa H. Bowler
*Assistant Examiner*—Mark H. Rinehart
*Attorney, Agent, or Firm*—Herbert Dubno; Andrew Wilford

[57] ABSTRACT

A remote control lock system for a vehicle has a coder of the transmitter and the decoder of the receiver designed to receive either a radio frequency or light frequency oscillator and detector, respectively, so that for a given coding system, different modes of wave transmission between the receiver and the transmitter can be effected.

9 Claims, 2 Drawing Sheets

CENTRAL LOCK SYSTEM FOR AUTOMOTIVE VEHICLE

CROSS REFERENCE TO RELATED APPLICATION

This application is a file-wrapper-continuation of application No. 08/071,647 filed 3 Jun. 1993, abandoned, with a claim to the priority of German application P 42, 21 142.5 filed 27 Jun. 1992.

FIELD OF THE INVENTION

The present invention relates to a central lock system for an automotive vehicle and, more particularly, to a remote locking and unlocking system for an automotive vehicle having at least one electrically-controllable door lock and a remote actuator whose transmitter functions as a code key to cooperate with a receiver on the vehicle functioning as a code lock.

BACKGROUND OF THE INVENTION

Central locking systems of the type in which the vehicle has at least one electrically operated door lock and which utilize a remote control to operate that door lock are known, e.g. from U.S. Pat. No. 4,596,985 and German Patent 32 44 049.

The remote control unit can include a transmitter functioning as a code key and a receiver functioning as a code lock with the coding unit in the transmitter coding a transmitted signal which is subjected, at the receiver, to decoding by a complementary decoding unit generating an actuating signal for the control electronics of the vehicle door lock or locks of the hood, trunk or other compartments which may be provided on the vehicle.

Remote operating systems can generally be referred to as wireless and contactless systems since the transmission of the signal between the transmitter and receiver takes place without a direct interconnection of the two, utilizing waves propagated through the space between them. The code key and the code lock are information-transmission and electronic analogs for bitting of the key and the lock cylinder of mechanical door locks.

Since it is desirable that the central locking system respond to the transmitter, i.e. the lock be actuated, only when the transmitter sends a particular coded signal generated by the coding device, the decoding device of the receiver must have a matching stored code which can correspond to the coded transmission signal and which upon decoding, operates the lock. When there is this match, the control electronics of the lock will receive from the decoding unit an actuating signal which can be, for example, a pulse or a pulse train or pulse sequence. When this condition is not fulfilled, i.e. the coded signal from the transmitter is not recognized at the decoder, the control electronics remains unactivated.

Upon decoding of a received transmitted signal which does not match the stored code at the decoder, other functions can be initiated, for example, a time-limited inactivation of the entire central locking system can be enforced, disabling the receiver and the control electronics for a certain period of time.

Central locking systems of this type have been described in the aforementioned U.S. Pat. No. 4,596,985 as well as German Patent 32 44 049. In these systems, transmitters and receivers are provided which operate with electromagnetic waves which can span the entire spectrum of electromagnetic waves including radio frequency and light frequencies. The coding unit and the oscillator at the transmitter on the one hand and the detector and the decoding unit at the receiver on the other, of course, must communicate with the same mode of electromagnetic transmission and with the same frequency.

It is important that the coding unit and the detecting unit be matched regardless of the frequency or mode, i.e. radio frequency or light frequency of the high-frequency carrier of the associated oscillator and detector.

The term "high-frequency carrier" is not intended here to refer to waves of a particular frequency range but rather is intended to refer to a carrier which can be modulated with the comparatively lower frequency code.

The limitations on the carrier frequencies of a particular oscillator and detector path have, however, posed problems in the use of central locking systems for automotive vehicles both in terms of the physical restrictions and even in terms of legal restrictions with respect to the band width and frequencies used of radio frequencies, for example, and the detrimental effects of some type of light frequencies. The band width of radio frequencies must be increased with increasing complexity of the codes transmitted for various purposes and with the increasing transmission speeds which may be required. The band width requirements differ from amplitude-modulation systems to frequency-modulation systems or pulse-duration modulators.

The life effects of use of oscillators operating at light frequencies can be of a thermal and/or quantum mechanical nature. For example, the maximum frequency of a sequence of on and off signals of a conventional incandescent lamp is very low because of the thermal afterglow. Because of the special matching requirements of the frequency of the high-frequency carrier, there are limitations on the oscillator and detector which may be used at any particular region or with any particular central locking system. Furthermore, at certain times, one user may elect to employ radio-frequency transmission while at other times the same user may require a light wave transmission system to operate the central locking system. Up to now, two different systems had to be provided with the transmitters and receivers being originally designed for the particular mode of wave transmission and with the transmitter and receiver including the coding and decoding units being achieved if a different mode of transmission was required.

OBJECTS OF THE INVENTION

It is the principal object of the present invention, therefore, to provide a central locking system with a remote actuator for an automotive vehicle lock whereby these drawbacks are avoided.

Still another object of the invention is to provide a remote actuated central locking system for an electrically operated door lock of a motor vehicle which can be selectively operated with radio frequency or light frequency carriers and yet is simple and inexpensive.

SUMMARY OF THE INVENTION

These objects are attained, in accordance with the invention by providing the transmitter and the receiver with their respective coding and decoding units such that the oscillator of the one and the detector of the other can be selected depending upon the mode of wave transmission which is desired, e.g. between an oscillator and detector operating with radio frequency waves and a detector and receiver operating with light frequency waves and such that the detector and oscillator modules are interchangeable, e.g. can be plugged in or plugged out of the respective circuits for use with the same coder or decoder, respectively.

More particularly, the invention provides a central locking system for an automotive vehicle with at least one electrically operated door lock, a remote actuating device having a transmitter functioning as a code key and a receiver functioning as a code lock, with the transmitter having a coding device for coding the transmitted signal and the receiver having a decoding device complementary to the coding device for decoding the received transmitted signal. The coding device can be selectively connected to an oscillator operating at radio frequency and at light frequency modulatable by the coding device, the oscillator producing the high-frequency carrier for the transmitted signal. Correspondingly, the decoding device can be selectively connected to a detector constructed to respond to the radio frequency signal or to a detector constructed to respond to the light-frequency signal and cooperating with the decoder. The coding unit and the decoding unit are both designed to operate with the two types of oscillators or the two types of detectors, respectively, and can be connectable selectively with them so that the decoding unit will produce the control signal for the control electronics of the door lock whichever the mode of wave transmission between the particular oscillator and detector which are provided.

The term "radio frequency" as used here is intended to refer to electromagnetic waves ranging from the ultrasonic to the so-called microwave region, while the term "light frequency" or "light wave frequency" is used to refer to frequencies including the visible light range as well as frequency in the near and far infrared range and in the ultraviolet range.

The sent signal or transmitted signal in either case is comprised of a high-frequency carrier (of radio wave frequency or light wave frequency) which has been modulated with the comparatively lower frequency code by means of a modulator which can be built into the oscillator or the coding unit.

The system whereby the coding unit or the decoding unit can be selectively operated with an oscillator or decoder for radio wave or light wave frequencies enables complex high-speed transmission of the codes by modulation of the radio frequency or light frequency carrier with the choice of oscillator and detector, practically no matching of the coding device and the decoding device is required, except, of course, for the matching of the codes therein, since the oscillators are interchangeable with one another for any coding device and the detectors are interchangeable with one another for any decoding device. Of course an electrical compatibility between each group of interchangeable detectors and the respective decoder and between each group of interchangeable oscillators and the respective coder is required as far as the electrical connections are concerned, i.e. the plug and jack connectors which may be used.

The invention thus enables for a key coding device and a given decoding device with whatever band width the coded transmission signal requires, the particular mode of transmission to be selected for the desired band width in accordance with the existing laws and user requirements.

The central locking system in accordance with the invention can be relatively simple and inexpensively produced since only a single coding unit and a single decoding unit need be provided for different modes of transmission, the selection of the frequency of the high-frequency carrier and the mode of wave transmission being determined by the oscillator and detector which are selected.

It is of special advantage that, for a central locking system which operates in the radio-frequency mode, the same code structure can be established as applies when light frequencies are used.

A vehicle manufacturer can provide the locking system with transmitter and receiver in a variety of variants utilizing a single code structure. This increase in the variants available to overcome drawbacks with operation in the radio frequency or light frequency mode, depending upon the exigencies, is especially desirable. For example, where radio interference and receiving problems resulting from polarization of radio waves is a problem, then light wave transmission may be preferred. On the other hand, where dirty windows or iced-up windows may be a problem in a motor vehicle or there may be a problem with providing a sufficiently high energy output, light frequencies may not be satisfactory. In either case, a selection of the wave transmission mode is available with the present invention.

More particularly, the central locking system for an automotive vehicle can comprise:

a central locking system for an automotive vehicle, comprising:

at least one electrically actuatable door lock on the automotive vehicle;

a remote actuator for the door lock and comprising a transmitter functioning as a code key; and a receiver on the vehicle responsive to a wireless signal transmitted by the transmitter and connected to the door lock, the receiver functioning as a code lock for the door lock, the transmitter comprising a coding unit for coding the wireless signal and the receiver having a decoding unit complementary to the coding unit for decoding the wireless signal and selectively operating the door lock in response thereto, the transmitter being selectively provided with a modulatable oscillator generating a high-frequency carrier of radio frequency and of light frequency, respectively, and connected to the coding unit, and the receiver being selectively provided with a respective detector responsive to the carrier generated by the oscillator selected for the transmitter, and the coding unit being constructed and arranged to operate either of the oscillators with which the transmitter can be provided, and the decoding unit being constructed and arranged to operate either of the detectors with which the receiver can be provided; and an electronic control circuit connected to the detector with which the receiver is provided for operating the lock.

The system can operate with a sequential transmission of code words in the manner described in U.S. Pat. No. 4,596,985. In that case, the coding unit has a memory which stores a binary code with a countable sequence of code bits, a starting bit, and an end bit such that the starting bit again follows each end bit, the decoding unit is configured for a decoding of the binary code, means is provided for synchronizing the transmitter and the receiver, upon actuation of the transmitter a code word form from the code bits of the sequence is radiated to the receiver, is decoded in the decoding unit and is converted into an actuating signal for the electronic control circuit, the transmitter and the receiver are synchronized after at least one ineffective actuation of the transmitter, each of the sequences of code bits in the transmitter and in the receiver forms an amount (n) of defined and different code words, each composed of a partial amount of the code bits, the code words being counted (1, 2, 3, . . . x, . . . n), the transmitter upon actuation sending each of the code words in succession so that at the $x^{th}$ actuation of the transmitter the $x^{th}$ code word is transmitted, with a corresponding count, the decoding unit decodes the code words in succession so that upon reception of the $x^{th}$ code word, the $x^{th}$ code word is converted to an unlocking signal for the electronic control circuit, and upon x=n in the counts in the transmitter and receiver, the sequencing of the code words begins again at 1.

The synchronization can be effected utilizing an auxiliary coding system and in that case, the means for synchronizing can include:

an auxiliary coding unit storing a quantity (m) of different auxiliary code words defining an auxiliary code forming a synchronizing signal, the auxiliary code words being counted in a sequence (1, 2, 3, . . . x, . . . m) and which do not belong to the quantity (n) of the code words converted to the unlocking signal, whereby upon actuation of the transmitter for the purpose of synchronizing the transmitter with the receiver, the transmitter sends a respective auxiliary code word and the auxiliary code words are counted in succession so that with the $x^{th}$ actuation of the transmitter, the $x^{th}$ auxiliary code word is received by the receiver, used in the unlocking signal and used in for synchronizing, the (x+1) auxiliary code word being successively sent and the auxiliary code words are counted so that upon x=m, the sequence at repeated at 1.

The aforedescribed coding device practically ensures fail-safe transmission of the signal which will unlock the vehicle door. The synchronizing system described allows synchronization upon a failure resulting from false actuation of the transmitter.

It is also advantageous to provide the transmitter of a key with conventional lock bitting for mechanical operation of the locking cylinder. This allows the central locking unit to also be actuated when there is a failure at the transmitter and/or receiver, for example, a failure in the current supply. The key bitting can also function as an antenna for a radio frequency oscillator of the transmitter.

BRIEF DESCRIPTION OF THE DRAWING

The above and other objects, features and advantages of the invention will become more readily apparent from the following description, reference being made to the accompanying highly diagrammatic drawing in which.

SPECIFIC DESCRIPTION

Figure 1:
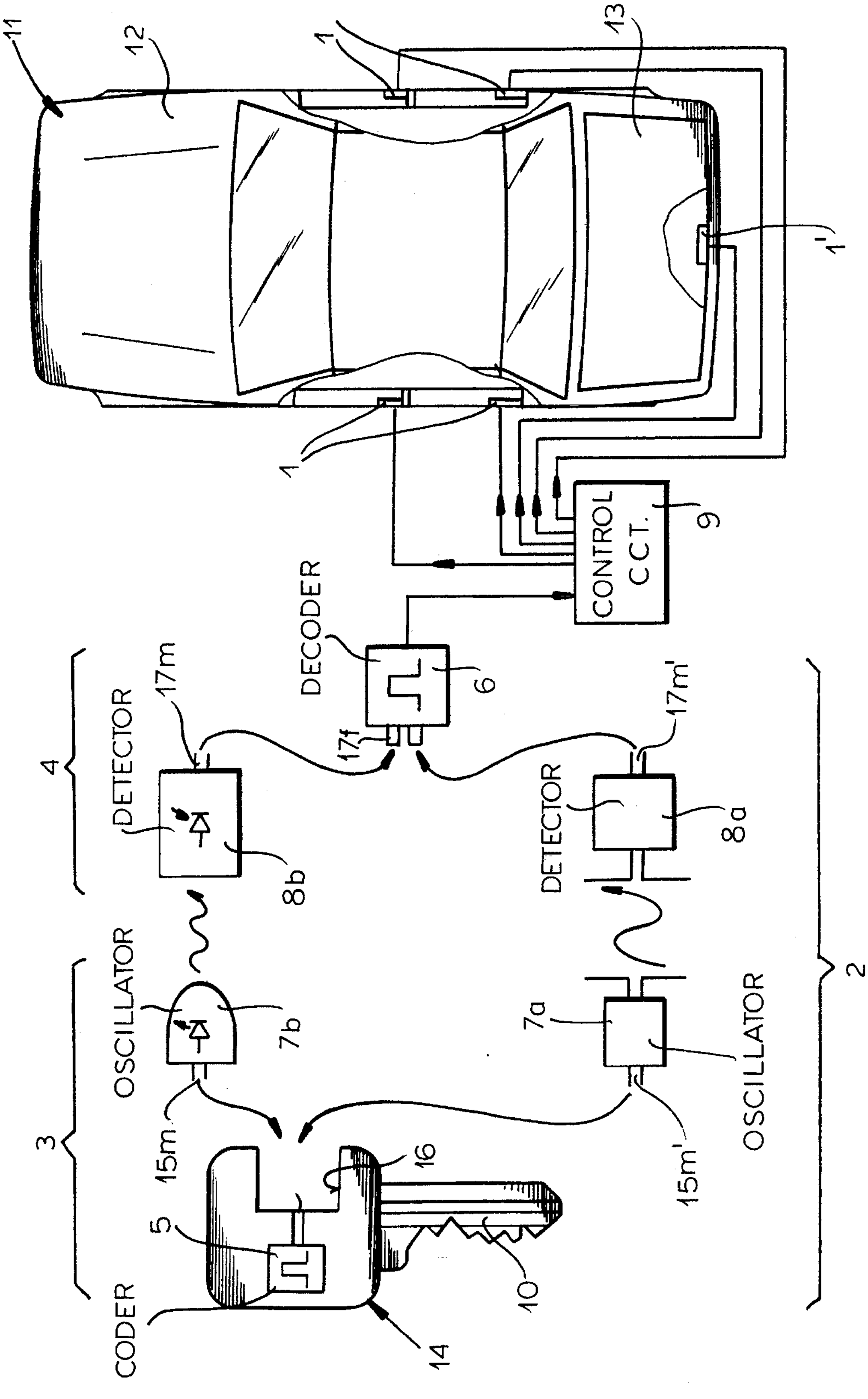
FIG. 1 is a diagram of the central lock system of the invention.

The system shown in FIG. 1 of the drawing is intended to operate one or more of a multiplicity of electrically-controlled door locks 1 of a vehicle 11 which can have a hood 12 provided with a corresponding lock and a trunk cover 13 also having an electrically operated lock 1'.

The portion of the apparatus referred to herein as the receiver, including the electronic circuitry for controlling the locks 1, 1' is likewise provided on the vehicle 11

The system comprises a remote control arrangement represented as a whole at 2 and including a transmitter 3 and a receiver 4. The receiver operates the control circuit 9 which, in turn, operates the electrically-controlled locks 1, 1' upon receipt of an actuating signal from a decoder unit 6.

The transmitter 3 functions as a code key and comprises, for this purpose, a coding unit 5 which can be built into a key 14, the bitting 10 of which can function as an antenna, if desired, for a radio-frequency oscillator when the radio wave mode of operation is used.

The transmitter can further include a current supply device, e.g. a battery, in the key 14 and an actuating element, e.g. a pushbutton, also on the key and neither of which is visible in FIG. 1.

The coding unit 5 can selectively be connected via plug and jack connectors **15*f* and 15*m* and 15*m'* to an oscillator 7*a* or 7*b* respectively modulatable by the coder 5** and emitting a radio-frequency carrier or a light-wave frequency carrier, respectively. The preferred modulation is a pulse position modulation.

The coder can therefore accommodate either of the two oscillators, one of which can be inserted into the receptacle 16 of the key for connection of its plug **15*m*, 15*m'* in the jack or mating connector 15*f*** of the transmitter. Special matching techniques are not required.

The radio-frequency oscillator **7*a*** can generate a high-frequency carrier in the frequency range of 433.92 MHz. Other possible frequencies lie between 224 MHz and 434 MHz, especially at 224.75 MHz, 303,825 MHz, 312.77 MHz, 315 MHz, 407 MHz and 418 MHz.

The light-frequency oscillator **7*b*** can be a semiconductor component, e.g. a LED and can generate its high-frequency carrier in the region of infrared frequencies.

The receiver 5 operates as a code lock and has, for this purpose, the decoder 6. The decoder 6 can also be connected by complementary male connectors **17*m* and 17*m'* and a female connector 17*f* to the complementary detectors 8*a* and 8*b***. Here as well no special matching technique is required.

In the coder 5 of the transmitter 3, a binary code with a countable sequence of code bits is stored with a starting bit as well as an end bit. The end bit is immediately followed by a starting bit anew. The decoder 6 is configured for complementary decoding of the binary code. The sender 3 and the receiver 4 are also coupled by a synchronizing system not shown in FIG. 1.

Figure 2:
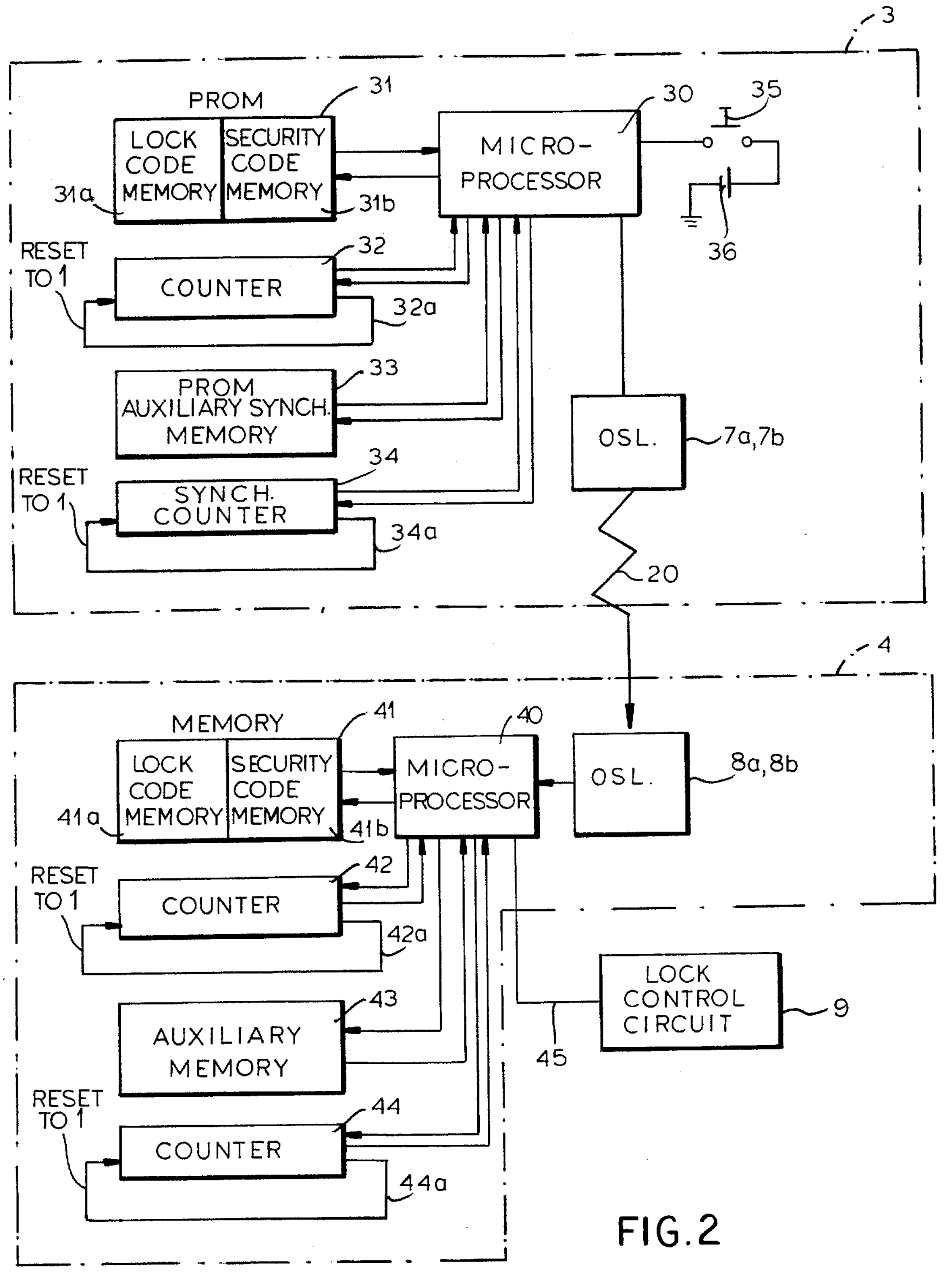
FIG. 2 is a block diagram of parts thereof.

Referring to FIG. 2, it can be seen that the receiver 3 can have in addition to the selected oscillator **7*a*, 7*b*, a microprocessor 30 which can be connected with a memory 31 containing a lock code memory 31*a* and a security code memory 31*b*, each of which contributes a respective sequence of code words or contributes to a common code word having lock code and security code parts of the code word. The counter 32 for the code words is also connected to the microprocessor 30 and has a reset 32*a* for resetting the counter to 1 when the maximum count n is reached. The transmitter also has a memory 33 for auxiliary code words, forming part of the means for synchronizing and connected to the microprocessor 30 along with the synchronization word counter 34 having a reset 34*a* for resetting to 1 when the count m is reached. In this Figure, moreover, I have shown a button 35 which can be depressed to actuate the transmitter and can be connected to a battery 36** which can serve as a source of power for the key lock or transmitter.

In FIG. 2 I have also shown in block diagram form, the receiver 4 with its oscillator 8*a* or 8*b*, designed to respond to the wave mode transmitted by the oscillator 7*a*, 7*b* as represented at 20 over the gap between the remote actuator and the vehicle. The oscillator has an input to a microprocessor 40 which can be connected to a memory 41 having sections 41*a* and 41*b* for the matching lock code and security code words, a counter 42 for counting the security code words, an auxiliary memory 43 for synchronizing codes and a counter 44 for the sequence of synchronizing codes. The counter 42 has a reset 42*a* which resets the counter to 1 when the count n is reached for the locking code words and the counter 44 has a reset 44*a* which resets to 1 when the count reaches m. The receiver has an output 45 to the lock control circuit 9 previously described.

Upon actuation of the transmitter 3 for the pushbutton 35, for example, a sequence of code bits corresponding to one word of the stored code words of the transmitter 3 is transmitted and is converted in the decoder 6 into the actuating signal for the electronic control 9 of the locks. The transmitter 3 and the receiver 4 after a single or multiple false actuation of the transmitter 3 is synchronizable.

The sequence of code bits in the transmitter 3 and receiver 4 represents a code word and a number n of defined, different code words each of a respective partial quantity of the code bits is stored in the memory 31.

The code words are counted (1, 2, 3, . . . x, . . . n). Upon actuation the transmitter 3 sends one of these code words to the receiver by wireless transmission and the count is advanced so that at the $x^{th}$ actuation, the $x^{th}$ code word is sent. The synchronized decoder 6 counts similarly and upon the $x^{th}$ actuation receives the $x^{th}$ code word and transforms that code word into the unlocking signal for the control electronics 9 and operates the locks. Upon x=n, the counter is reset and the sequence is begun again.

The synchronization is effected utilizing the auxiliary coding unit including the memory 33 and the auxiliary code word counter 4. The auxiliary code is formed by a number m of different auxiliary code words which are counted at 34 (1, 2, 3, . . . x, . . . m). They do not belong to the number n of code words referred to previously. Upon actuation of the transmitter 3, the transmitter sends, for the purpose of synchronization, one of these auxiliary code words and counts so that the $x^{th}$ auxiliary code word is sent upon the $x^{th}$ actuation.

The receiver has the auxiliary decoding means, here represented by the auxiliary memory 33 and the counter 44, which counts and provides, upon the $x^{th}$ actuation, a match for the received $x^{th}$ auxiliary code word if the system is actuated to allow the unlocking signal to be generated and effects synchronization if the match does not occur. As at the transmitter, the count continues until the $x+1^{th}$ auxiliary code word effects synchronization, if the transmitter and receiver were out of synchronization, and upon x=m the sequence is begun again. The code sequencing and synchronization in this manner correspond to that of the U.S. patent mentioned. The coder 5 of the transmitter 3 and the decoder 6 of the receiver 4 operate with a so-called changing code which can comprise an unlocking code word with a fixed key code word portion and a changing security code word portion.

The fixed or lock code word portion can be different for each central locking system and thus is individual to the vehicle or the user. In the coding device 5 and the decoder 6, therefore, a number n of security code word parts can be stored which can be sequentially outputted in the manner described and can give rise to the unlocking signal only when the $x^{th}$ actuation of the transmitter not only provides the $x^{th}$ security word part but also an $x^{th}$=$c^{th}$ word where c can be, for example 25. As a consequence, the remote control device 2 can only lose synchronization after c false transmissions of the transmitter 3.

The so-called transmission protocol can include an arousal signal or enabling which can trigger the receiver 4 from a stand-by state in which it utilizes a low current, to a fully enabled state, a start signal for the time synchronization of the coding device 5 with the decoding device 6 and an unlocking code word.

Surprisingly the coding unit 5 and the decoding unit 6 can be so configured that in spite of the relatively complex code structure described and the correspondingly large band width which is required, the operation can be effected not only with a radio frequency oscillator 7*a* but also with a light frequency oscillator 7*b* (with complementary detectors 8*a* and 8*b*) without special matching procedures.

The bitting 10 of the key 14 can serve to mechanically actuate the lock cylinder of the central locking unit in case of power failure at the transmitter or an emergency in the vehicle.

I claim:

1. A central locking system set for an automotive vehicle, the set comprising:

a central lock system for an automotive vehicle, including:

a lock actuator having a coder for coding a signal for wireless transmission to the automotive vehicle, a receiver on the vehicle having a decoder responsive to the signal, and an electronically operated lock means of the vehicle connected with the receiver and responsive to an output of the decoder for selectively activating and deactivating a lock of the vehicle;

a radio-frequency oscillator and a light-frequency oscillator;

releasable connection means including respective plugs and sockets on the oscillators and actuator for selectively coupling either of the oscillators individually mechanically and electronically with the actuator;

a radio-frequency detector complementary to the radio-frequency oscillator and a light-frequency detector complementary to the light-frequency oscillator; and releasable connection means including respective interfitting plugs and sockets on the detectors and receiver for selectively coupling either of the detectors individually mechanically and electronically with the receiver, depending upon which of the oscillators is coupled to the actuator, the coder and decoder both having bandwidths for processing both radiofrequency and light-frequency signals.

2. The set defined in claim 1 wherein:

the coder has a memory which stores a binary code with a countable sequence of code bits, a starting bit, and an end bit such that the starting bit again follows each end bit, the decoder is configured for a decoding of the binary code, means is provided for synchronizing the actuator and the receiver, upon operation of the actuator a code word formed from the code bits of the sequence is radiated to the receiver, is decoded in the decoder and is converted into an actuating signal for the electronically operated lock means, the actuator and the receiver are synchronized after at least one ineffective actuation of the actuator, each of the sequences of code bits in the actuator and in the receiver forms an amount (n) of defined and different code words, each composed of a partial amount of the code bits, the code words being counted (1, 2, 3, . . . x, . . . n), the actuator upon operation sending each of the code words in succession so that at the $x^{th}$ actuation of the actuator the $x^{th}$ code word is transmitted, with a corresponding count, the decoder unit decodes the code words in succession so that upon reception of the $x^{th}$ code word, the $x^{th}$ code word is converted to an unlocking signal for the electronically operated lock means, and upon x=n in the counts in the actuator and receiver, the sequencing of the code words begins again at 1.

3. The set defined in claim 2 wherein the means for synchronizing includes:

an auxiliary coding unit storing a quantity (m) of different auxiliary code words defining an auxiliary code forming a synchronizing signal, the auxiliary code words being counted in a sequence (1, 2, 3, . . . x, . . . m) and which do not belong to the quantity (n) of the code words converted to the unlocking signal, whereby upon operation of the actuator for the purpose of synchronizing the actuator with the receiver, the actuator sends a respective auxiliary code word and the auxiliary code words are counted in succession so that with the $x^{th}$ actuation of the actuator, the $x^{th}$ auxiliary code word is received by the receiver, used in the unlocking signal and used in for synchronizing, the (x+1) auxiliary code word being successively sent and the auxiliary code words are counted so that upon x=m, the sequence at repeated at 1.

4. The set defined in claim 3 wherein the actuator is a key with bitting for mechanically operating the lock.

5. The set defined in claim 1, further comprising means for synchronizing the actuator with the receiver, the means for synchronizing including:

an auxiliary coding unit storing a quantity (m) of different auxiliary code words defining an auxiliary code forming a synchronizing signal, the auxiliary code words being counted in a sequence (1, 2, 3, . . . x, . . . m), whereby upon operation of the actuator for the purpose of synchronizing the actuator with the receiver, the transmitter sends a respective auxiliary code word and the auxiliary code words are counted in succession so that with the $x^{th}$ actuation of the actuator, the $x^{th}$ auxiliary code word is received by the receiver, used in an unlocking signal and used in for synchronizing, the (x+1) auxiliary code word being successively sent and the auxiliary code words are counted so that upon x=m, the sequence at repeated at 1.

6. The set defined in claim 5 wherein the actuator is a key with bitting for mechanically operating the lock.

7. The set defined in claim 1 wherein the actuator is a key with bitting for mechanically operating the lock.

8. The set defined in claim 1 wherein the oscillators are both of the same format, whereby they are interchangeable.

9. The set defined in claim 1 wherein the detectors are both of the same format, whereby they are interchangeable.

* * * * *